United States Patent [19]
Yamada et al.

[11] Patent Number: 5,598,416
[45] Date of Patent: Jan. 28, 1997

[54] DATA COMMUNICATION SYSTEM

[75] Inventors: Daisuke Yamada, Kawasaki; Osamu Kato, Yokohama, both of Japan

[73] Assignee: Matsushita Electric Industrial Company, Ltd., Osaka, Japan

[21] Appl. No.: 386,463

[22] Filed: Feb. 10, 1995

[30] Foreign Application Priority Data

Feb. 18, 1994 [JP] Japan .................................. 6-020950

[51] Int. Cl.⁶ ...................................................... H04J 3/16
[52] U.S. Cl. ........................... 370/468; 370/335; 370/337
[58] Field of Search ................................. 370/95.1, 95.3, 370/85.7, 84, 18; 379/0.59, 34, 60; 455/33.1, 33.2, 54.1, 54.2; 375/200, 205

[56] References Cited

U.S. PATENT DOCUMENTS

| | | | |
|---|---|---|---|
| 4,701,943 | 10/1987 | Davis et al. | 379/57 |
| 5,115,309 | 5/1992 | Hang | 370/118 |
| 5,115,429 | 5/1992 | Hluchyj et al. | 370/94.3 |
| 5,258,979 | 11/1993 | Oomuro et al. | 370/95.1 |
| 5,321,721 | 6/1994 | Yamaura et al. | 370/118 |
| 5,323,383 | 6/1994 | Satoh | 370/85.7 |

FOREIGN PATENT DOCUMENTS

| | | |
|---|---|---|
| 0472511A2 | 2/1992 | European Pat. Off. . |
| 0529154A1 | 3/1993 | European Pat. Off. . |
| 0538546A1 | 4/1993 | European Pat. Off. . |
| 0627827A2 | 12/1994 | European Pat. Off. . |
| 1117439A | 5/1989 | Japan . |
| 2274131A | 11/1990 | Japan . |
| 8701254A1 | 2/1987 | WIPO . |
| 9303569A1 | 2/1993 | WIPO . |

OTHER PUBLICATIONS

K. Sriram, "Dynamic Bandwidth Allocation and Congestion Control Schemes for Voice and Data Multiplexing in Wideband Packet Technology", IEEE International Conference on Communications Supercomm/ICC'90, Atlanta, US., 15 Apr. 1990, pp. 1003–1009.

*Primary Examiner*—Douglas W. Olms
*Assistant Examiner*—Ajit Patel

[57] ABSTRACT

In case the number of usable channels is insufficient when a data communication system transmits information by using a plurality of channels, an information transmission rate reduction detector circuit included in a terminal interface circuit requests a terminal to reduce an information transmission rate and thereby reduce the probability of call blockage of the terminal. Also, in case the number of usable channels is insufficient at the time of hand over, hand over failure of the data communication system is reduced by lowering the information transmission rate of the terminal.

10 Claims, 6 Drawing Sheets

DATA COMMUNICATION SYSTEM

BACKGROUND OF THE INVENTION

The present invention relates to a data communication system in a mobile radio using a TDMA (Time Division Multiple Access) method or CDMA (Code Division Multiple Access) method.

Figure 1:
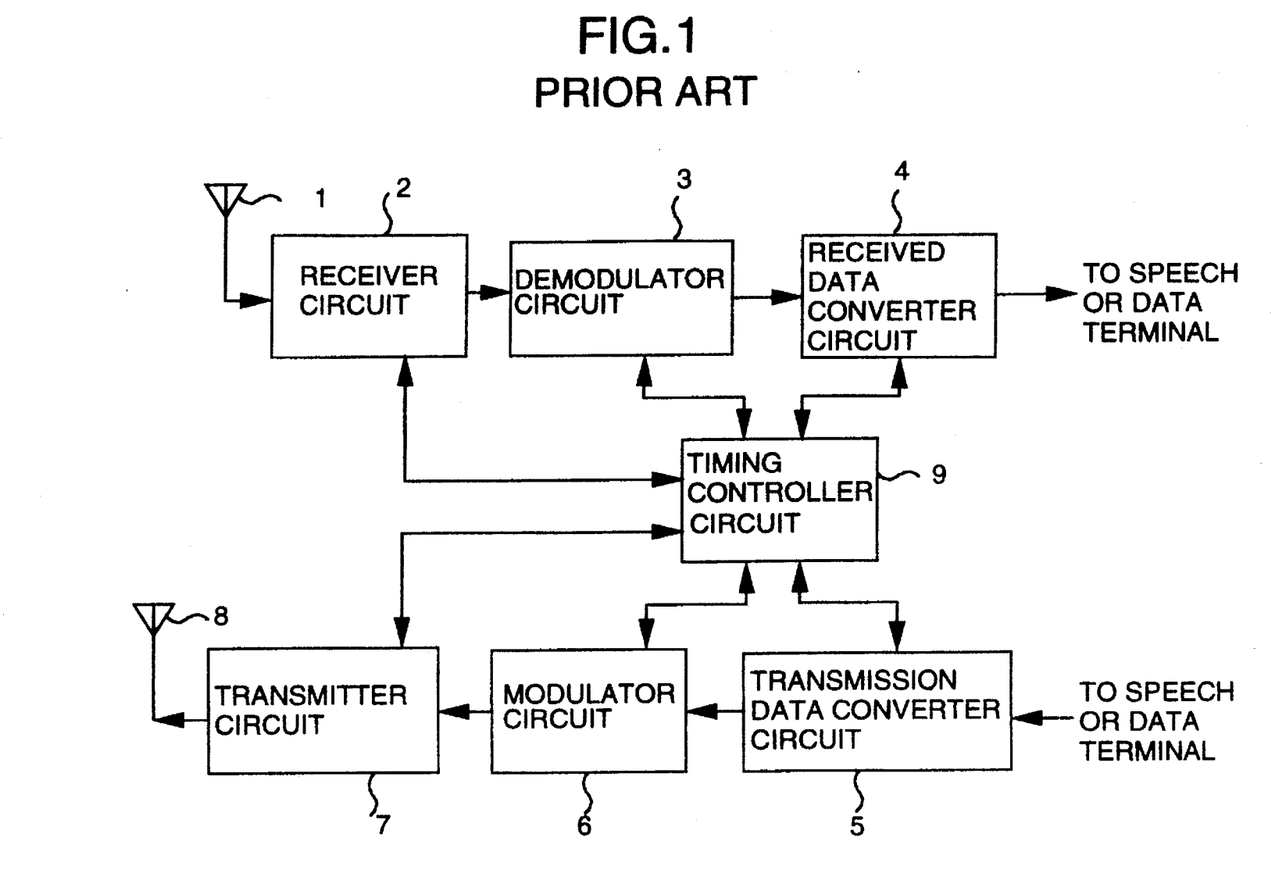
FIG. 1 is a block diagram showing the configuration of a data communication system using a TDMA method according to a conventional technique.

FIG. 1 shows the block diagram of a conventional data communication system using the TDMA method. On a transmitting side of FIG. 1, a speech or data signal is inputted to a transmission data converter circuit 5 and supplied therein with a control signal and the like to form a frame. A resultant signal is modulated in a modulator circuit 6, converted in a transmitter circuit 7 to have a desired carrier frequency, and transmitted from a transmitting antenna 8 to a base station. On a receiving side, a receiving antenna 1 receives a signal from the base station. A receiver circuit 2 converts the received signal to a base band signal. A demodulator circuit 3 demodulates a base band data. A received data converter circuit 4 splits the base band data into a received control signal and a received speech or data signal, and outputs the received speech or data signal. A timing controller circuit 9 exercises control over every timing and sequence of the data communicattion system.

Figure 2:
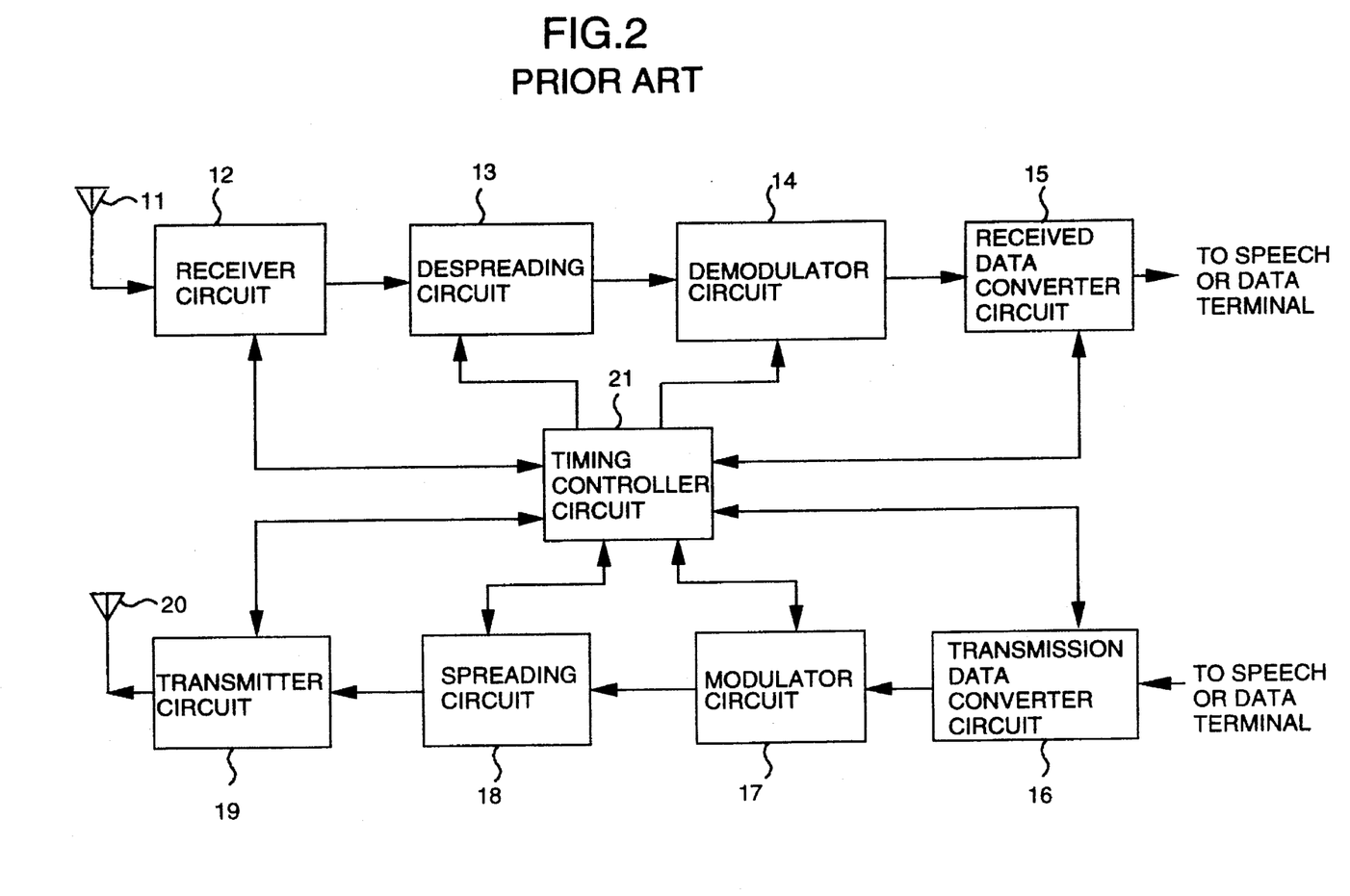
FIG. 2 is a block diagram showing the configuration of a data communication system using a CDMA method according to a conventional technique.

FIG. 2 shows the block diagram of a conventional data communication system using the CDMA method. On a transmitting side of FIG. 2, a speech or data signal is inputted to a transmission data converter circuit 16 and supplied therein with a control signal and the like to form a frame. A resultant signal is modulated in a modulator circuit 17, spreaded in a spreading circuit 18, then converted in a transmitter circuit 19 to have a desired carrier frequency, and transmitted from a transmitting antenna 20. On a receiving side, a receiving antenna 11 receives a signal from a base station. A despreading circuit 13 performs correlation detection. Furthermore, a demodulator circuit 14 demodulates a base band data. A received data converter circuit 15 splits the base band data into a received control signal and a received speech or data signal and outputs the received speech or data signal. A timing controller circuit 21 exercises control over every timing and sequence of the data communicattion system.

In the TDMA method, however, information which can be transmitted on one channel is determined by unit slot. In case data transmission (of high-speed data, image or the like) exceeding a transmission rate determined by unit slot is to be performed, transmission is performed by using a plurality of channels simultaneously. If the number of usable channels is insufficient when it is desired to use a plurality of channels, data cannot be transmitted, and call block is caused. The TDMA method has such a problem. In the case of the CDMA method as well, data cannot be transmitted, and call block is caused in the same way when the number of usable channels is insufficient. Furthermore, if the number of usable channels is insufficient at the time of hand over, hand over in the data communication system fails.

SUMMARY OF THE INVENTION

The present invention solves such problems of the conventional techniques. An object of the present invention is to provide an excellent data communication system capable of reducing the probability of call blockage in transmitting data exceeding the number of usable channels.

In case the number of usable channels is insufficient when information such as high speed data or an image is to be transmitted by using a plurality of channels, a data communication system according to the present invention includes a terminal interface for requesting a reduction of an information transmission rate or a source encoding rate to a speech/data/video terminal (a speach terminal, a data termnal or a video terminal) in order to achieve the above described object.

In case the number of usable channels is insufficient, therefore, the probability of call blockage in a speech/data/ video terminal can be reduced by reducing the information transmission rate according to the present invention. Furthermore, also in case the number of usable channels is insufficient at the time of hand over, hand over failure in the data communication system can be reduced by reducing the information transmission rate.

DESCRIPTION OF THE PREFERRED EMBODIMENTS

Embodiment 1

Figure 3:
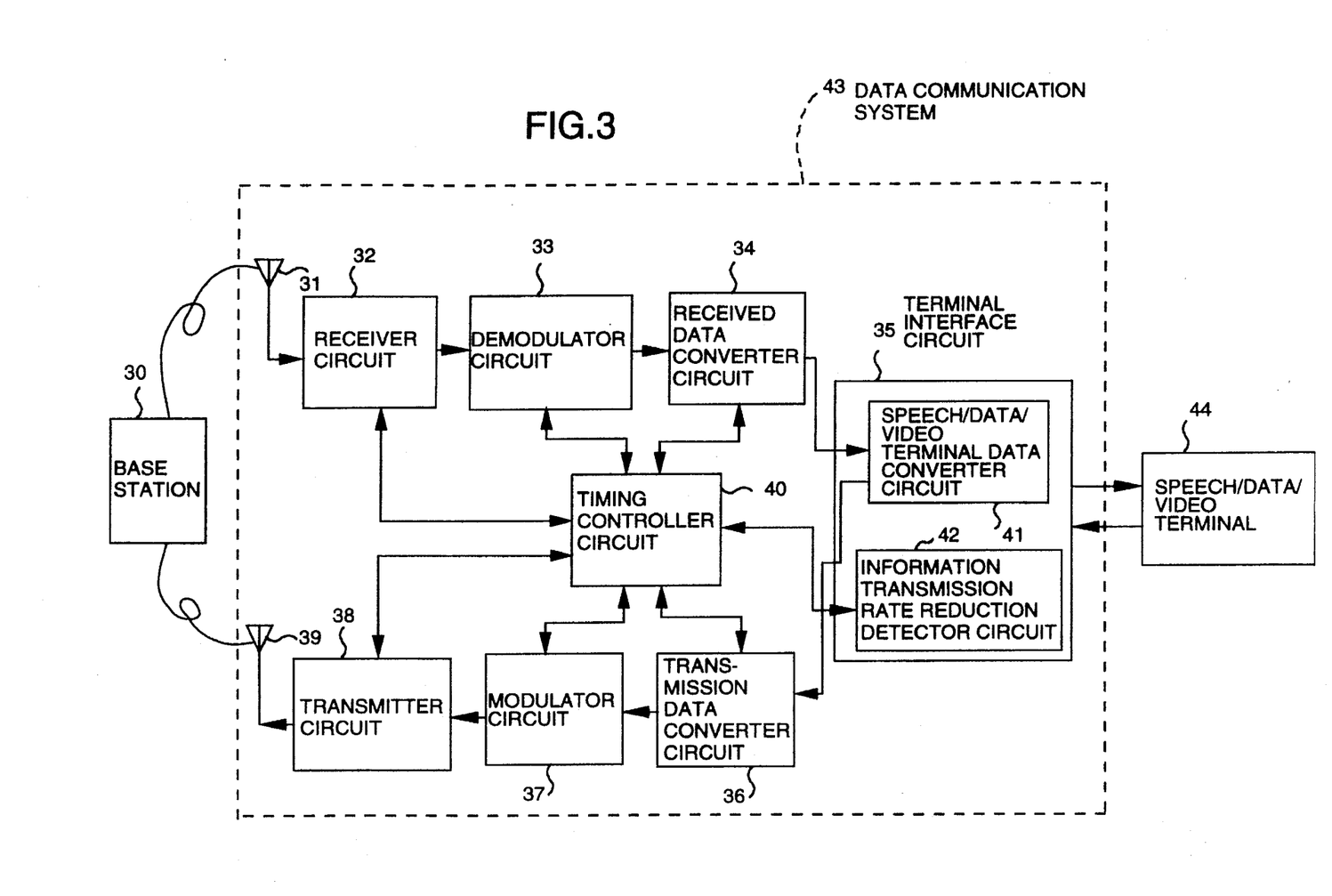
FIG. 3 is a block diagram showing the configuration of a TDMA data communication system according to a first embodiment of the present invention.

FIG. 3 is a block diagram of a TDMA data communication system showing a first embodiment of the present invention. In FIG. 3, a base station 30 communicates with a data communication system 43. A receiving antenna 31 receives a signal from the base station 30. A receiver circuit 32 receives a signal from the antenna 31. A demodulator circuit 33 demodulates a signal supplied from the receiver circuit 32. A received data converter circuit 34 splits a signal supplied from the demodulator circuit into a received control signal and a received speech/data/video signal (a speach signal, a data signal or a video signal). A terminal interface circuit 35 includes a speech/data/video terminal data converter circuit 41 and an information transmission rate reduction detector circuit 42. A transmission data converter circuit 36 adds a control signal to a speech/data/video signal supplied from the terminal interface circuit 35 to form a frame. A modulator circuit 37 modulates a signal supplied from the transmission data converter circuit 36. A transmitter circuit 38 transmits a signal supplied from the modulator circuit 37 to the base station 30 via a transmitting antenna 39. A timing controller circuit 40 controls timing of the data communication system 43. A speech/data/video terminal 44 transmits and receives signals to communicate with the data communication system 43.

Operation of the above described first embodiment will now be described. According to information to be transmitted from the speech/data/video terminal 44, the terminal 44 outputs to the terminal interface circuit 35 a request for the number of channels which the terminal 44 desires to use. This request is inputted to the timing controller circuit 40 via the speech/data/video terminal data converter circuit 41 and the information transmission rate reduction detector circuit 42 of the terminal interface circuit 35, and inputted to the transmission data converter circuit 36 as a control signal. The transmission data converter circuit 36 adds the control signal to the speech/data/video signal to form a frame. In the modulator circuit 37, the signal supplied from the transmission data converter circuit 36 is modulated by using one of the various modulation methods. The signal supplied from the modulator circuit 37 is converted in the transmitter circuit 38 to have a desired carrier frequency and transmitted from the transmitting antenna 39 to the base station 30.

On a receiving side of the data communication system 43, a signal supplied from the base station 30 is received by the receiving antenna 31, and converted in the receiver circuit 32 to a base band signal. In the demodulator circuit 33, a base band data is demodulated. In the received data converter circuit 34, the demodulated base band data is split into a received control signal and a received speech/data/video signal. In the speech/data/video terminal 44, desired information is obtained. In the timing controller circuit 40, the number of usable channels is detected from the received control signal inputted from the base station 30 via the received data converter circuit 34. The terminal interface circuit 35 is informed of the detected number of usable channels. The information transmission rate reduction detector circuit 42 of the terminal interface circuit 35 compares the number of channels requested by the speech/data/video terminal 44 with the number of usable channels. If the number of usable channels is insufficient for the requested number of channels, the information transmission rate reduction detector circuit 42 outputs an information transmission rate reduction request signal to the speech/data/video terminal 44.

Figure 4:
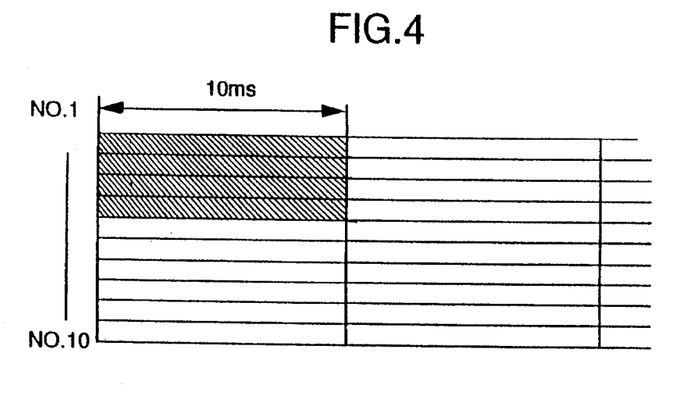
FIG. 4 is a diagram showing transmission of information of four channels in one frame.
Figure 5:
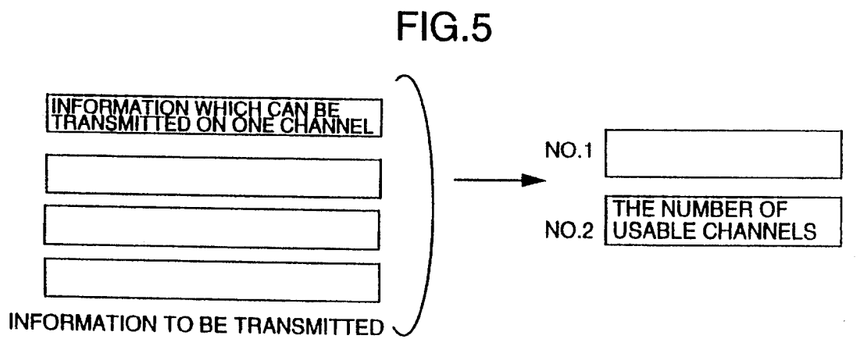
FIG. 5 is a diagram showing the number of channels of information to be transmitted and the number of usable channels.
Figure 6:
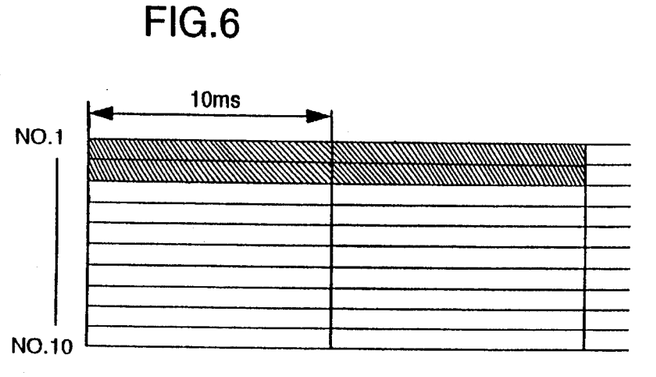
FIG. 6 is a diagram showing transmission of information of four channels in two frames.

With reference to FIG. 4, it is now assumed that information at a rate of 32 kb/sec can be transmitted in one channel in the system. In case it is desired to transmit data at a rate of 128 kb/sec, it is necessary to use four channels. In case the number of usable channels is four or more on the basis of information supplied from the base station, transmission of 128 kb/sec (representd by shaded regions) can be made in one frame (10 ms) as shown in FIG. 4. However, in case the number of usable channels is two on the basis of information supplied from the base station as shown in FIG. 5, transmission of 128 kb/sec cannot be made in one frame and call block is caused in case of the conventional data communication system. In the data communication system 43 of the present embodiment, however, the probability of call blockage can be reduced by lowering the information transmission rate and performing transmission in two frames (represented by shaded regions) as shown in FIG. 6.

If, in the case of a data terminal, changeover to a lower rate and transmission with the lower rate are desired even if it takes time, instead of call block, the data terminal transmits a low rate changeover signal of information rate to the terminal interface circuit 35. If, in the case of a video terminal, it is desired to transmit images even if the image quality is degraded, the video terminal transmits a low rate changeover signal of source encoding rate to the terminal interface circuit 35. On the basis of this changeover signal, the terminal interface circuit 35 transmits information on usable channels.

Figure 7:
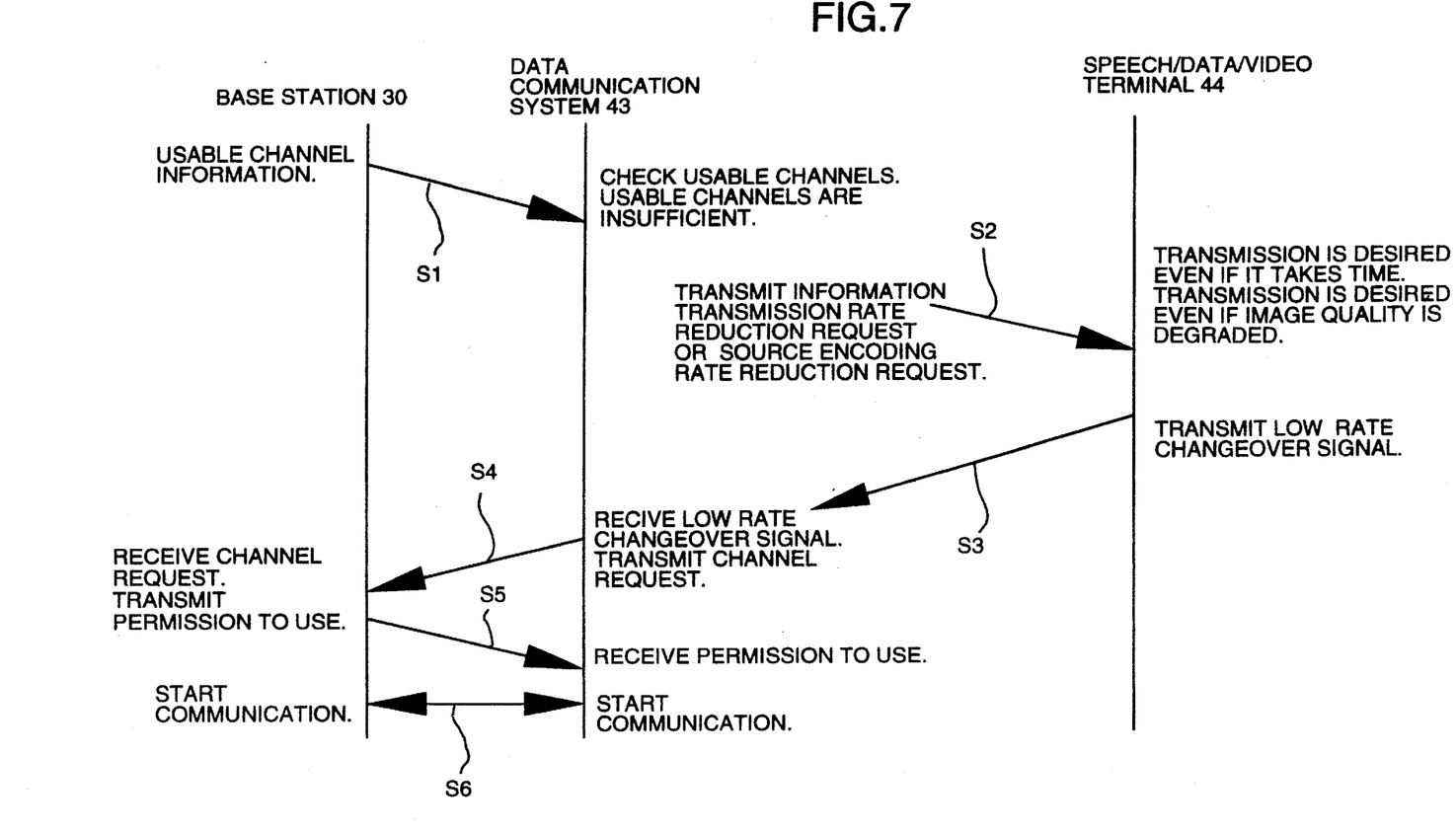
FIG. 7 is a signal sequence diagram among a base station, a data communication system, and a speech/ data/ivideo terminal.

These operations will now be described by referring to FIG. 7. Usable channel information is transmitted from the base station 30 to the data communication system 43 (S1). The data communication system 43 compares the number of channels to be used with the number of usable channels. If the number of usable channels is insufficient, the data communication system 43 transmits an information transmission rate reduction request or a source encoding rate reduction request to the speech/data/video terminal 44 (S2). If transmission is desired even if it takes time or transmission is desired even if the image quality is degraded, the speech/data/video terminal 44 transmits a low rate changeover signal to the data communication system 43 (S3). The data communication system 43 receives the low rate changeover signal and transmits a channel request within the number of usable channels (S4). The base station 30 receives the channel request and transmits permission to use the channels (S5). The data communication system 43 receives the permission to use the channels and starts communication with the base station 30 (S6).

When the data communication system 43 makes a hand over request to another base station, it is now assumed that the number of channels which can be used by another base station is insufficient. In this case as well, the data communication system 43 attempts to reduce failure of hand over due to insufficiency of channels by negotiating for reduction of information transmission rate.

Although it has been assumed that a single base station and a single terminal are involved in the present embodiment, a plurality of base stations and a plurality of terminals may be involved.

Further, in the TDMA data communication system according to the present embodiment, information of a plurality of channels is transmitted by assigning a plurality of unit slots.

Embodiment 2

Figure 8:
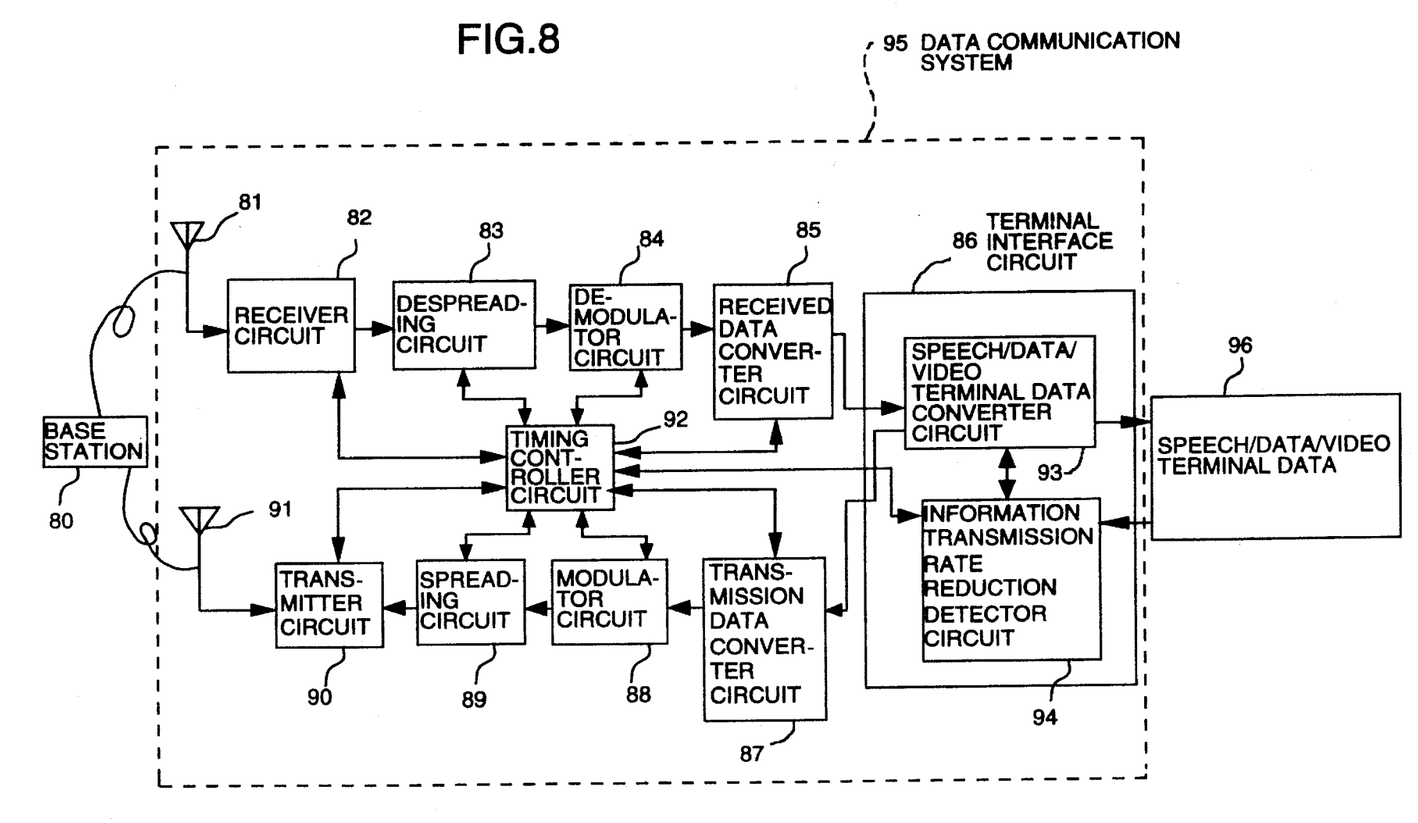
FIG. 8 is a block diagram showing the configuration of a CDMA data communication system according to a second embodiment of the present invention.

FIG. 8 is a block diagram of a CDMA data communication system showing a second embodiment of the present invention. In FIG. 8, a base station 80 communicates with a data communication system 95. A receiving antenna 81 receives a signal from the base station 80. A receiver circuit 82 receives a signal from the antenna 81. A despreading circuit 83 performs correlation detection on a signal supplied from the receiver circuit 82. A demodulator circuit 84 demodulates a signal supplied from the despreading circuit 83. A received data converter circuit 85 splits a signal supplied from the demodulator circuit 84 into a received control signal and a received speech/data/video signal. A terminal interface circuit 86 includes a speech/data/video terminal data converter circuit 93 and an information transmission rate reduction detector circuit 94. A transmission data converter circuit 87 adds a control signal to a speech/data/video signal to form a frame. A modulator circuit 88 modulates a signal supplied from the transmission data converter circuit 87. A spreading circuit 89 spreads a signal supplied from the modulator circuit 88. A transmitter circuit 90 transmits a signal supplied from the spreading circuit 89 to the base station 80 via a transmitting antenna 91. A timing controller circuit 92 controls timing of the data communication system 95. A speech/data/video terminal 96 transmits and receives signals to communicate with the data communication system 95.

Operation of the above described second embodiment will now be described. According to information to be transmitted from the speech/data/video terminal 96, the terminal 96 outputs to the terminal interface circuit 86 a request for the number of channels which the terminal 96 desires to use. This request is inputted to the timing controller circuit 92 via the speech/data/video terminal data converter circuit 93 and the information transmission rate reduction detector circuit 94 of the terminal interface circuit 86, and inputted to the transmission data converter circuit 87 as a control signal. The transmission data converter circuit 87 adds the control signal to a speech/data/video signal to form a frame. In the modulator circuit 88, the signal is modulated by using one of the various modulation methods. In the spreading circuit 89, a signal supplied from the modulator circuit 88 is subjected to code spreading. A signal supplied from the spreading circuit 89 is then converted in the transmitter circuit 90 to have a desired carrier frequency and transmitted from the transmitting antenna 91 to the base station 80.

On a receiving side of the data communication system 95, a signal supplied from the base station 80 is received by the receiving antenna 81, and converted in the receiver circuit 82 to a base band signal. In the despreading circuit 83, correlation detection is performed. In the demodulator circuit 84, a base band data is demodulated. In the received data converter circuit 85, the demodulated base band data is split into a received control signal and a received speech/data/video signal. In the speech/data/video terminal 96, desired information is obtained. In the timing controller circuit 92, the number of usable channels is detected from the received control signal inputted from the base station 80 via the received data converter circuit 85. The terminal interface circuit 86 is informed of the detected number of usable channels. The information transmission rate reduction detector circuit 94 of the terminal interface circuit 86 compares the number of channels requested by the speech/data/video terminal 96 with the number of usable channels. If the number of usable channels is insufficient for the requested number of channels, the information transmission rate reduction detector circuit 94 outputs an information transmission rate reduction request signal to the speech/data/video terminal 96.

When the data communication system 95 makes hand over request to another base station, it is now assumed that the number of channels which can be used by another base station is insufficient. In this case as well, the data communication system 95 attempts to reduce failure of hand over due to insufficiency of channels by negotiating for reduction of information transmission rate.

Although it has been assumed that a single base station and a single terminal are involved in the present embodiment, a plurality of base stations and a plurality of terminals may be involved.

Further, in the CDMA data communication system according to the present embodiment, information of a plurality of channels is transmitted by assigning a plurality of spreading codes.

We claim:

1. A data communication system provided between a base station and a terminal, said data communication system receiving transmission data from said terminal and transmitting said transmission data to said base station through at least one usable channel in a plurality of channels, said data communication system comprising:

(a) a terminal interface which comprises:
      (i) means for determining whether a number of usable channels included in said at least one usable channel is sufficient for transmission of the transmission data at one of a first information transmission rate and a first source encoding rate;
      (ii) means for requesting said terminal to reduce an information transmission rate, at which said transmission data is transmitted, from said first information transmission rate to a second information transmission rate when the means for determining determines that the number of usable channels is insufficient for transmission at said first information transmission rate and for requesting said terminal to reduce a source encoding rate, with which said transmission data is generated, from said first source encoding rate to a second source encoding rate when said means for determining determines that the number of usable channels is insufficient for transmission at said first source encoding rate;

(b) a received data converter circuit for receiving from said base station a first signal including a control signal indicating said number of usable channels;

(c) timing control means for receiving from said terminal a second signal indicating a number of said plurality of channels which said terminal desires to use for transmitting said transmission data and for generating a transmission control signal which indicates said number of channels which said terminal desires to use;

(d) said received data converter circuit providing said control signal to said timing control means, said timing control means detecting said number of usable channels from said control signal and informing said means for determining of said number of usable channels; and (e) a transmission data converter circuit for adding said transmission control signal received from said timing control means to the transmission data received from said terminal for transmission to said base station.

2. A data communication system according to claim 1, wherein said received data converter circuit takes out said control signal from said first signal.

3. A data communication system provided between a base station and a terminal, said data communication system receiving transmission data from said terminal and transmitting said transmission data to said base station through at least one usable channel in a plurality of channels, said data communication system comprising:

(a) a terminal interface which comprises:
      (i) means for determining whether a number of usable channels included in said at least one usable channel is sufficient for transmission of the transmission data at one of a first information transmission rate and a first source encoding rate;
      (ii) means for requesting said terminal to reduce an information transmission rate, at which said transmission data is transmitted, from said first information transmission rate to a second information transmission rate when the means for determining determines that the number of usable channels is insufficient for transmission at said first information transmission rate and for requesting said terminal to reduce a source encoding rate, with which said transmission data is generated, from said first source encoding rate to a second source encoding rate when said means for determining determines that the number of usable channels is insufficient for transmission at said first source encoding rate, wherein said transmission data are transmitted in accordance with a time division multiple access operation in which an amount of information transmitted in any one of said plurality of channels is transmitted in accordance with a number of unit slots assigned to said any one of said plurality of channels.

4. A data communication system provided between a base station and a terminal, said data communication system receiving transmission data from said terminal and transmitting said transmission data to said base station through at least one usable channel in a plurality of channels, said data communication system comprising:

(a) a terminal interface which comprises:
(i) means for determining whether a number of usable channels included in said at least one usable channel is sufficient for transmission of the transmission data at one of a first information transmission rate and a first source encoding rate;
(ii) means for requesting said terminal to reduce an information transmission rate, at which said transmission data is transmitted, from said first information transmission rate to a second information transmission rate when the means for determining determines that the number of usable channels is insufficient for transmission at said first information transmission rate and for requesting said terminal to reduce a source encoding rate, with which said transmission data is generated, from said first source encoding rate to a second source encoding rate when said means for determining determines that the number of usable channels is insufficient for transmission at said first source encoding rate, wherein said transmission data are transmitted in accordance with a code division multiple access operation through said at least one usable channel after being spread over said at least one usable channel by way of spreading codes which are assigned to each channel of said at least one usable channel.

5. A data communication system provided between a base station and a terminal, said data communication system receiving transmission data from said terminal and transmitting said transmission data to said base station through at least one usable channel in a plurality of channels, said data communication system comprising a terminal interface which comprises:

means for receiving from said terminal one of a first number indicating a number of channels desired to be used for transmitting said transmission data at one of a first information transmission rate and a first source encoding rate and a second number indicating a number of channels to be needed at a time of hand over and for receiving from said base station a third number indicating a number of usable channels included in said at least one usable channel; and an information transmission rate reduction detector means for comparing said one of said first number and said second number with said third number and for requesting said terminal to reduce one of (a) an information transmission rate from said first information transmission rate to a second rate information transmission when said third number represents a number of usable channels that is insufficient for transmission or said hand over at said first information transmission rate and (b) a source encoding rate from said first source encoding rate to a second source encoding rate when said third number represents a number of usable channels that is insufficient for transmission or said hand over at said first source encoding rate.

6. A data communication system according to claim 5, wherein;

said terminal comprises a video terminal;

said transmission data comprise image data; and said information transmission rate reduction detector circuit requests said video terminal to reduce said source encoding rate when said information transmission rate reduction detector circuit determines that said number of usable channels is insufficient.

7. A data communication system according to claim 5, wherein:

(a) said means for receiving comprises a received data converter circuit for receiving from said base station a first signal including a control signal indicating said third number indicating said number of usable channels;

(b) said information transmission rate reduction circuit comprises timing control means for receiving from said terminal a second signal indicating said first number indicating said number of channels desired to be used for transmitting said transmission data and for generating a transmission control signal which indicates said first number indicating said number of channels desired to be used;

(c) said received data converter circuit providing said control signal to said timing control means, said timing control means detecting said number of usable channels from said control signal; and (d) a transmission data converter circuit for adding said transmission control signal received from said timing control means to the transmission data received from said terminal for transmission to said base station.

8. A data communication system according to claim 7, wherein said received data converter circuit takes out said control signal from said first signal.

9. A data communication system according to claim 5, wherein said transmission data are transmitted in accordance with a time division multiple access operation in which an amount of information transmitted in any one of said plurality of channels is transmitted in accordance with a number of unit slots assigned to said any one of said plurality of channels.

10. A data communication system according to claim 5, wherein said transmission data are transmitted in accordance with a code division multiple access operation through said at least one usable channel after being spread over said at least one usable channel by way of spreading codes which are assigned to each channel of said at least one usable channel.

* * * * *